Aug. 9, 1960   G. A. TINNERMAN   2,948,062
METHOD OF FORMING A SELF-CLINCHING AND SEALING FASTENER
Filed July 17, 1957
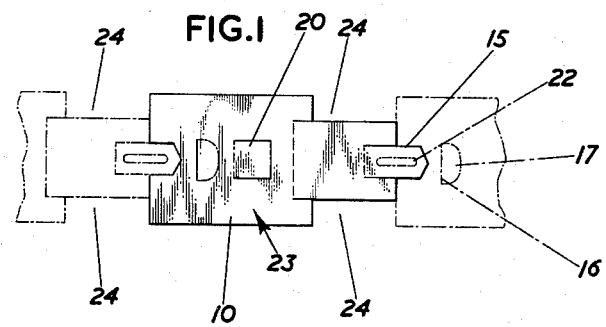
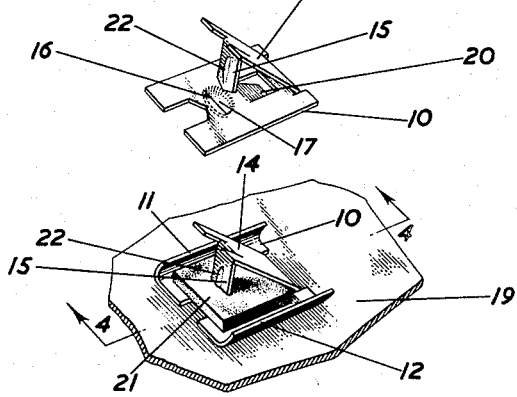
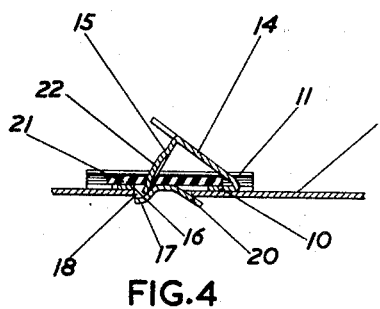
FIG.4
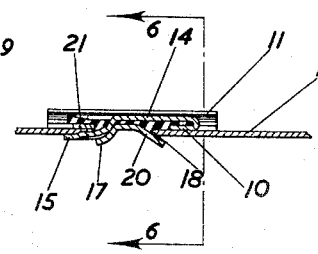
FIG.5
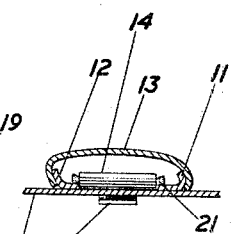
FIG.6
Inventor
GEORGE A. TINNERMAN
By~ Featherstonhaugh & Co.
Attys.

United States Patent Office 2,948,062
Patented Aug. 9, 1960

2,948,062

METHOD OF FORMING A SELF-CLINCHING AND SEALING FASTENER

George A. Tinnerman, 17864 Beach Road, Lakewood, Ohio

Filed July 17, 1957, Ser. No. 672,403

3 Claims. (Cl. 29—513)

This invention relates to fasteners of the type which are intended to be locked in place upon an apertured panel for securing a molding or other part, e.g. a bracket, to the panel.

The invention will be illustrated by reference to the automotive industry and the provision of fasteners on panels of the car bodies, which fasteners will serve as mountings for decorative moldings. It should, however, be appreciated that the invention is not confined to this field, and could be employed to secure, for example, chrome trim and a bracket to the outer and inner surfaces respectively of a refrigerator panel.

It has been the practice in the past to provide apertures at spaced intervals in automobile body panels, to locate molding clips having bendable fastening arms in said apertures, and to fasten them therewithin by deforming the bendable arms by means of pliers or tongs, or by rotation-imparting, or stud-expanding, tools. The molding clips which are thus located and locked in position serve as anchoring means for the decorative moldings which are usually snap-mounted upon the clips.

The problems of leakage of moisture, dirt, and noise through the apertures in the body panels has in the past been obviated by providing each fastener with a layer, block, or blob of waterproof, yieldable, sealing material such as a thermo-plastic or thermo-setting material, or a rubber or rubber-like material, the said sealing material being located upon the fastener at least over the area thereof which is designed to overlie the panel aperture when the clip is fastened in position. While these arrangements have satisfactorily solved the problems of leakage through the apertures they have added considerably to the expense of manufacturing the fasteners for reasons which will be referred to more fully later on. Furthermore, the fastening clips of the prior art have called for special tools and a certain amount of skill in their use by the workman whose job it is to clinch the fasteners in place in the apertures in the panels, all of which has, in production line operations, slowed the passage of semi-finished automobile bodies carrying the panels in question.

The present invention provides a fastener which can be used as a molding clip to secure trim to apertured panels, and which, without special tools or any particular skill, can by a simple application of pressure generally transversely of the panel, be driven into locked position within an aperture on the panel where it is to be employed. This avoids misapplication of the fasteners since their application is straightforward and no special skill is required in the operation of the applying tools.

The device according to the invention may be generally defined as a fastener designed to be partially inserted into and locked within an aperture in a panel, said fastener comprising a malleable metal member having a generally rectangular base, an arm carried by said base near one end thereof, said arm extending angularly above the base and meeting it at an acute angle, a deformable tongue extending downwardly from said arm substantially at right-angles thereto, a tongue receiving passage in said base, a tongue-deflecting element extending downwardly from said base below said passage, said element being shaped to deflect said deformable tongue toward the end of said base remote from the end carrying said arm whenever said tongue is forced downwardly through said orifice by pressure applied to said arm generally transversely of said base, and a locking lip struck from said base at a point intermediate said passage and the end of the base carrying said arm, said locking lip extending downwardly and towards the end of said base carrying said arm.

The fastener of the invention preferably includes a layer of sealing material which is laid upon the upper surface of the rectangular base so as to entirely cover the portions thereof where said tongue-receiving passage and said locking lip are located.

The fasteners of the invention are, as is conventional in this art, fabricated by passing a strip of sheet metal through a plurality of cutting and bending dies. This sequence of operations lends itself well to the incorporation of the layer of sealing material during the actual fabrication of the metallic fastener. The sealing layer is preferably applied by feeding a strip of the sealing material generally at right angles across the metallic strip at an intermediate point during the fabrication of said strip into individual fastening elements, and cutting off a suitable portion of the strip of sealing material for application to each individual fastener element being formed. The layer of sealing material is laid upon the surface of the rectangular base before the arm carrying the tongue is fully bent into position. Completion of the bending operation causes the end of the tongue to impale and pass through the layer of sealing material thus located in the desired position. This is a very economical method of manufacture compared to the prior art processes for affixing the sealing material, all of which prior processes have involved, as far as the applicant is aware, application of the sealing material as a secondary operation which is carried out after the metallic portion of the fastener has been completely formed and finished. Thus, for example, according to one prior process, fasteners which are otherwise completely formed and finished have the sealing material applied to them by placing the individual fasteners in an injection molding machine and there applying a substantial thickness of plastic sealing material over the crucial areas of the fastener. Another prior procedure has involved taking the fully finished metallic portion of the fastener and first attaching a small blob of sealing material in jelly-like form to the crucial area and then subjecting the thus treated product to a two-stage process of heating and curing. The rather complicated fabrication procedures of the prior art have often acted to destroy any corrosion-resistant coating which the metal employed to make the prior fasteners initially may have had. Thus, in applications where corrosion-resistance is important, it has usually been necessary to give the fasteners a corrosion-resistant coating as the final step in their manufacture.

With fasteners according to the invention, however, whether they include a sealing strip as in the preferred form or not, the process of fabrication is so simple that, if the metallic strip material originally employed has a corrosion-resistant coating, this coating will not be destroyed during fabrication so that the finally formed fastener is corrosion-resistant without any secondary step being required. In this connection, the applicant wishes to advise that he has had excellent results with a mild-carbon, cold-rolled, strip steel which has been electro-galvanized.

This invention will be more fully understood by consideration of the following detailed specification taken in conjunction with the accompanying drawings.

In the drawings:

Figure 1 is a plan view of a blank from which fasteners according to the invention may be produced;

Figure 2 is a perspective view of one embodiment of the invention,

Figure 3 is a perspective view of another embodiment of the invention, which embodiment is designed for use as a molding clip.

Figure 4 is a longitudinal section showing the embodiment illustrated in Figure 3 in place on a panel and ready to be locked in position.

Figure 5 is a longitudinal section, similar to Figure 4, but showing the fastener locked in position by deformation of the tongue, and Figure 6 is a transverse section taken substantially along the line 6—6 of Figure 5, Figure 6 additionally showing a molding strip snap-engaged by the mounted fastener.

The presently preferred embodiment of the invention is a molding clip of the class designed to be partially inserted into and locked within an aperture in a work panel, whereupon the fastener can be utilized to engage the inturned edges of the molding strip so as to secure said strip to the panel. Figures 3, 4, 5 and 6 of the drawings illustrate this preferred embodiment, showing the nature of the fastener, how it is mounted, and how it is in turn used to mount a molding strip. As best seen in Figures 3 and 4, the fastener according to this preferred embodiment of the invention comprises a malleable metal member having a generally rectangular base 10 whose longitudinal edges 11 and 12 have been bent upwardly to provide means for snap-engaging the inturned edges of a molding strip (such as the strip 13 shown in Figure 6). The rectangular base 10 carries an arm 14 near one end thereof, arm 14 extending angularly above the base and meeting it at an acute angle, as best seen in Figure 4. A deformable tongue 15 extends downwardly from arm 14 substantially at right angles thereto, and a tongue-receiving passage 16 is provided in the base 10. A tongue-deflecting element 17 extends from the base on the side thereof opposite the arm 14. Preferably, the tongue-receiving passage 16 and tongue-deflecting means 17 are jointly constituted by a half dimple struck from the material forming the base. This half dimple construction cannot be particularly clearly seen in the embodiment illustrated in Figures 3 to 6 but it is, however, clear in the embodiment illustrated in Figure 2. Prior to locking of the device in position within an aperture, such as the aperture illustrated at 18 in the panel 19 shown in Figures 4, 5 and 6, the arm 14 serves to poise the tip of the tongue 15 at the mouth of the passage 16.

A locking lip 20 is struck from the base 10 at a point intermediate the passage 16 and the end of the base which carries the arm 14. Locking lip 20 extends downwardly and toward the end of the base carrying the arm 14. In the preferred form, the tongue-deflecting means has a half-cup formation as shown in Figure 2, but it could be shaped as an arcuately curved arm or given any other shape which would accomplish its essential function of deflecting the tongue 15 into locking engagement with the under-surface of the channel 19 as shown in Figure 5.

It will be noted that the device illustrated in Figures 4 to 6 includes a sealing layer 21 constituted by a layer of yieldable sealing material which is laid upon the base 10 and completely covers the portions thereof wherein the tongue-deflecting means 17 and the locking lip 20 are located. The layer of sealing material 21 is held in its proper location upon the base, prior to utilization of the fastener, by virtue of the fact that the tongue 15 is at least partially passed through layer 21 once it has been positioned upon the upper surface of the base 10.

In order to provide the tongue 15 with additional strength, it is preferred to provide it with a longitudinally extending rib 22. Alternatively, the tongue may be transversely bowed over at least a portion of its length, in order to impart strength to it.

While the use of the fastener illustrated in Figures 3 to 6 is probably already clear from the drawings and what has been said above, the manner of employment of the fastener will be briefly described. The locking lip 20 and the tongue-deflecting means 17 are inserted through the aperture 18 in the panel 19 and, with the base 10 resting flush against the panel 19, pressure is applied to the arm 14 in a direction generally transversely of the panel. Such pressure forces the arm 14 into general parallelism with the base 10, at the same time driving the tongue 15 through the tongue-receiving passage 16 and the aperture 18 in the panel, whereupon the tongue-deflecting means 17 causes the leading portions of the tongue to be upwardly directed against the under surface of the 19, thus deforming the tongue so that it acts in conjunction with the locking lip 20 to securely fasten the element against withdrawal from the panel. Once a row of the fasteners have been applied in this manner in a row of suitably spaced apertures 18, it is a simple matter to affix the molding strip 13 by forcing its inturned edges into snap-engagement with the upwardly turned longitudinal edges 11 and 12 of the row of fasteners affixed to the panels.

As can best be appreciated by reference to Figure 5, the pressure applied to the arm 14 will not only serve to distort the tongue 15 into locking position, but will also serve to distort the layer of yieldable sealing material 21 so as to prevent any possibility of leakage of moisture, dirt or noise through the aperture 18 via either the tongue-receiving passage 16 or the region of the base which is cut away in order to form the locking lip 20.

Certain applications of the invention do not require any sealing of the apertures in the panel. In such a case the sealing layer 21 can be omitted altogether, as has been done in the case of the embodiment of the invention shown in Figure 2. Furthermore, there are certain applications for a fastener element having a plain base, in which case one need only omit the steps of forming the longitudinally bent edges 11 and 12. It will be noted that the fastener illustrated in Figure 2 lacks the upwardly bent edges.

Figure 1 has been provided to show those who may wish to practise the invention an economical way in which to manufacture the novel fastener. A continuous strip of sheet metal 23 is symmetrically blanked away as indicated at 24 and is passed through a series of cutting, shaping and bending dies which are utilized to strike out, from the single strip, a plurality of similar fastener elements each having integrally formed therewith an arm carrying a tongue, a tongue-deflecting element and a locking lip. As the strip of material 23 is passed through the series of cutting and forming dies a strip of sealing material may be fed at right angles across the strip 22 and cut into suitable lengths, one of which is placed upon the base of each fastener element being formed. The thus-positioned length of sealing material is fastened in the desired position by passing the tongue 15 at least partially therethrough.

It will be appreciated that the sealing layer and fastener could, if desired, be kept separate until the fastener is to be mounted on an apertured panel, and only incorporated into the fastener when the latter is being locked into position upon the panel.

What I claim as my invention is:

1. The method of forming a self-clinching and sealing fastener designed to be secured to a panel in conjunction with an aperture therein, said fastener having a base carrying a clinching tongue adapted to pass through an orifice in the base to engage a deflecting and clinching element and also including a locking lip struck from said base which comprises forming said base, tongue, orifice, deflector and lip, bending said tongue as to position the free end thereof in alignment with said orifice and deflector but spaced therefrom, placing a section of yieldable sealing material on said base and between said base and tongue and overlying said orifice and orifice of said struck tongue and underlying said tongue and deflecting said tongue to an extent sufficient partially to pierce said section of sealing material as to retain it on said base to form a composite sealing fastener, and whereby finally to clamp and compress said section and cause it to project partially into said orifices and said aperture in said panel when said tongue is deformed to clamp said base on said panel.

2. The method of forming a self-clinching and sealing fastener designed to be secured to a panel in conjunction with an aperture therein, said fastener having a base carrying a clinching tongue adapted to pass through an orifice in the base to engage a deflecting and clinching element and also including a locking lip struck from said base which comprises forming said base, tongue, orifice, deflector and lip, bending said tongue as to position the free end thereof in alignment with said orifice and deflector but spaced therefrom, feeding a strip of yieldable sealing material to dispose a section thereof on said base and between said base and tongue and overlying said orifice and orifice of said struck tongue and underlying said tongue, cutting said strip to leave said section as an individual piece on said base and deflecting said tongue to an extent sufficient partially to pierce said section as to retain it on said base whereby finally to clamp and compress said section and cause it to project partially into said orifices and said aperture in said panel when said tongue is deformed to clamp said base on said panel.

3. The method of forming a self-clinching and sealing fastener designed to be secured to a panel in conjunction with an aperture therein, said fastener having a base carrying a clinching tongue adapted to pass through an orifice in the base to engage a deflecting and clinching element and also including a locking lip struck from said base which comprises forming said base, tongue, orifice, deflector and lip, bending said tongue as to position the free end thereof in alignment with said orifice and deflector but spaced therefrom, feeding a strip of yieldable sealing material substantially at right angles to said base to dispose a section thereof on said base and between said base and tongue and overlying said orifice and orifice of said struck tongue and underlying said tongue, cutting said strip to leave said section as an individual piece on said base and deflecting said tongue to an extent sufficient partially to pierce said section as to retain it on said base whereby finally to clamp and compress said section and cause it to project partially into said orifices and said aperture in said panel when said tongue is deformed to clamp said base on said panel.

References Cited in the file of this patent

UNITED STATES PATENTS

| | | |
|---|---|---|
| 1,765,052 | Carr | June 17, 1930 |
| 2,041,514 | Reiter | May 19, 1936 |
| 2,217,574 | Tinnerman | Oct. 8, 1940 |
| 2,698,472 | Knohl | Jan. 4, 1955 |
| 2,786,249 | Poupitch | Mar. 26, 1957 |
| 2,833,011 | Scott | May 6, 1958 |